United States Patent
Prohel et al.

(10) Patent No.: US 7,478,126 B2
(45) Date of Patent: Jan. 13, 2009

(54) INITIALIZING RELATIONSHIPS BETWEEN DEVICES IN A NETWORK

(75) Inventors: Andrew M. Prohel, San Francisco, CA (US); Philip McKay, San Francisco, CA (US); Himgan Wibisono, San Francisco, CA (US); Michael Hoch, San Jose, CA (US); Jeff Liu, Fremont, CA (US); Ravi Gauba, Fremont, CA (US); Sidney Wang, Pleasanton, CA (US); Ippei Tambata, San Francisco, CA (US); Elizabeth Coppinger, Montclair, NJ (US); Michael S. Harwayne, New York, NY (US); Rodger Lea, Vancouver (CA)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 953 days.

(21) Appl. No.: 10/407,537

(22) Filed: Apr. 4, 2003

(65) Prior Publication Data

US 2003/0233399 A1    Dec. 18, 2003

Related U.S. Application Data

(60) Provisional application No. 60/371,183, filed on Apr. 8, 2002.

(51) Int. Cl.
*G06F 15/16* (2006.01)
(52) U.S. Cl. .................... 709/204; 709/207; 709/227
(58) Field of Classification Search ............. 709/203, 709/204, 217–224, 232, 205, 227
See application file for complete search history.

(56) References Cited

U.S. PATENT DOCUMENTS

| 5,796,393 | A | 8/1998 | MacNaughton et al. |
| 5,799,318 | A | 8/1998 | Cardinal et al. |
| 5,940,830 | A | 8/1999 | Ochitani |
| 5,983,214 | A * | 11/1999 | Lang et al. ............ 707/1 |
| 6,029,195 | A | 2/2000 | Herz |
| 6,112,181 | A | 8/2000 | Shear et al. |
| 6,176,425 | B1 | 1/2001 | Harrison et al. |
| 6,205,478 | B1 * | 3/2001 | Sugano et al. ........... 709/223 |
| 6,226,618 | B1 | 5/2001 | Downs et al. |

(Continued)

FOREIGN PATENT DOCUMENTS

DE    19929188 A1    11/2001

(Continued)

OTHER PUBLICATIONS

International Search Report, PCT/US03/10848, Oct. 23, 2003, 1 pg.

(Continued)

*Primary Examiner*—Phuoc H Nguyen
(74) *Attorney, Agent, or Firm*—Blakely, Sokoloff, Taylor & Zafman LLP

(57) ABSTRACT

A relationship initiation between devices in a network is described. According to one embodiment, persona information is exchanged between devices in a network. Based upon the persona information, a user of a device may initiate a relationship with another device.

34 Claims, 6 Drawing Sheets

U.S. PATENT DOCUMENTS

| | | | |
|---|---|---|---|
| 6,249,226 | B1 | 6/2001 | Harrison et al. |
| 6,249,282 | B1 * | 6/2001 | Sutcliffe et al. ............. 709/203 |
| 6,279,000 | B1 | 8/2001 | Suda et al. |
| 6,342,830 | B1 | 1/2002 | Want et al. |
| 6,438,579 | B1 | 8/2002 | Hosken |
| 6,446,208 | B1 | 9/2002 | Gujar et al. |
| 6,480,961 | B2 | 11/2002 | Rajasekharan et al. |
| 6,490,579 | B1 | 12/2002 | Gao et al. |
| 6,504,920 | B1 | 1/2003 | Okon et al. |
| 6,519,629 | B2 * | 2/2003 | Harvey et al. ................ 709/204 |
| 6,523,022 | B1 | 2/2003 | Hobbs |
| 6,678,680 | B1 | 1/2004 | Woo |
| 6,728,729 | B1 | 4/2004 | Jawa et al. |
| 6,742,032 | B1 | 5/2004 | Castellani et al. |
| 6,757,710 | B2 | 6/2004 | Reed |
| 6,865,599 | B2 * | 3/2005 | Zhang ........................ 709/218 |
| 6,944,669 | B1 | 9/2005 | Saccocio |
| 6,947,966 | B1 | 9/2005 | Oko, Jr. et al. |
| 6,957,199 | B1 * | 10/2005 | Fisher .......................... 705/78 |
| 6,961,723 | B2 | 11/2005 | Faybishenko et al. |
| 6,968,333 | B2 | 11/2005 | Abbott et al. |
| 7,010,537 | B2 | 3/2006 | Eyal et al. |
| 7,092,952 | B1 * | 8/2006 | Wilens ........................ 707/100 |
| 7,117,245 | B1 | 10/2006 | Levkoff et al. |
| 7,130,807 | B1 | 10/2006 | Mikurak |
| 7,162,488 | B2 | 1/2007 | DeVorchik et al. |
| 2001/0039656 | A1 | 11/2001 | Nakamura et al. |
| 2001/0051996 | A1 | 12/2001 | Cooper |
| 2002/0002483 | A1 | 1/2002 | Siegel et al. |
| 2002/0027567 | A1 | 3/2002 | Niamir |
| 2002/0028889 | A1 | 3/2002 | McCoskey et al. |
| 2002/0055919 | A1 | 5/2002 | Mikheev |
| 2002/0062290 | A1 | 5/2002 | Ricci |
| 2002/0077988 | A1 | 6/2002 | Sasaki et al. |
| 2002/0091642 | A1 | 7/2002 | Rahnasto |
| 2002/0107701 | A1 | 8/2002 | Batty et al. |
| 2002/0138744 | A1 | 9/2002 | Schleicher et al. |
| 2002/0147880 | A1 | 10/2002 | Baldonado |
| 2002/0156917 | A1 * | 10/2002 | Nye ............................ 709/238 |
| 2003/0009570 | A1 * | 1/2003 | Moskowitz et al. ......... 709/229 |
| 2003/0028610 | A1 | 2/2003 | Pearson |
| 2003/0037097 | A1 | 2/2003 | Meyer et al. |
| 2003/0037157 | A1 | 2/2003 | Pestoni et al. |
| 2003/0041108 | A1 * | 2/2003 | Henrick et al. .............. 709/205 |
| 2003/0046281 | A1 | 3/2003 | Son |
| 2003/0115318 | A1 | 6/2003 | Wueste |
| 2003/0121008 | A1 | 6/2003 | Tischer |
| 2003/0126245 | A1 | 7/2003 | Feltin et al. |
| 2003/0158958 | A1 | 8/2003 | Chiu |
| 2004/0030741 | A1 | 2/2004 | Wolton et al. |
| 2004/0039707 | A9 | 2/2004 | Ricci |
| 2005/0113066 | A1 | 5/2005 | Hamberg |
| 2005/0266835 | A1 | 12/2005 | Agrawal et al. |
| 2007/0106780 | A1 * | 5/2007 | Farnham et al. ............. 709/223 |

FOREIGN PATENT DOCUMENTS

| | | |
|---|---|---|
| EP | 0993163 A1 | 12/2000 |
| EP | 1154390 A2 | 11/2001 |
| GB | 2367916 A | 4/2002 |
| WO | WO 01/01239 A2 | 1/2001 |
| WO | WO 01/06398 A2 | 1/2001 |
| WO | WO 01/46843 A2 | 6/2001 |
| WO | WO 01/75640 A2 | 10/2001 |

OTHER PUBLICATIONS

Chu, et al., "MusicSummary Using Key Phrases", Cambridge Research Laboratory, Technical Report Series, Apr. 2000, pp. 1-11.

Papadopouli, et al., "Design and Implementation of a Peer-to-Peer Data Dissemination and Prefetching Tool for Mobile Users", Internet Publication, Mar. 2001, XP002307671.

Kortuem, et al., "Close Encounters: Supporting Mobile Collaboration Through Interchange of User Profiles", Proceedings First International Symposium on Handheld and Ubiquitous Computing (HUC99), 1999, Karlsruhe, Germany & Lecture Notes in Computer Science, vol. 1707. Retrieved from the internet: URL:http://www.comp.lancs.ac.uk/{kortuem/publications/HUC99-kortuem.pdf.

"The Gnutella Protocol Specification Passage", Aug. 19, 2000, XP002972229.

* cited by examiner

US 7,478,126 B2

INITIALIZING RELATIONSHIPS BETWEEN DEVICES IN A NETWORK

RELATED APPLICATIONS

This application claims the benefit of U.S. Provisional Application No. 60/371,183, filed Apr. 8, 2002, incorporated herein by reference.

FIELD OF THE INVENTION

This invention relates generally to networked devices, and more particularly to the initiation of relationships between devices.

COPYRIGHT NOTICE/PERMISSION

A portion of the disclosure of this patent document contains material, which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 2002, Sony Electronics, Inc., All Rights Reserved.

BACKGROUND OF THE INVENTION

The Internet has created the ability for many new types of virtual communities. Online communities exist for all sorts of reasons, including; product reviews, shared interests, socialization and the selling or auctioning of goods and services to name a few. These services are currently centralized, server-based services. Being centralized (e.g., hosted on a single server or group of servers) makes it easy for the service to poll the activity level and generate reports or displays of the current community status and activity. In contrast, a decentralized service does not provide for a service to generate reports and display decentralized information as with the centralized service.

SUMMARY OF THE INVENTION

Persona information is exchanged between devices in a network. Based upon the persona information, a user of a device may initiate a relationship with another device.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1:
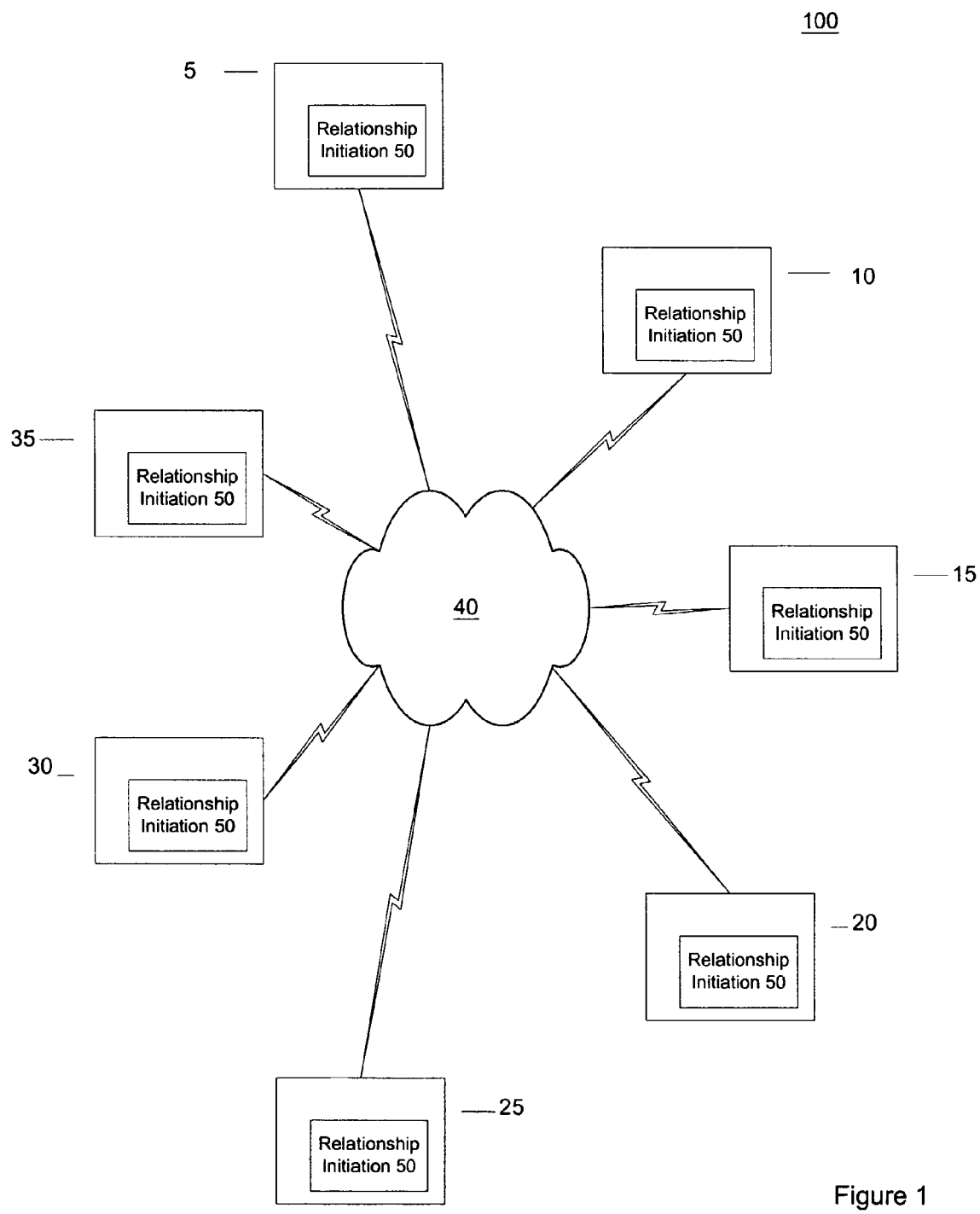
FIG. 1 illustrates one embodiment of a peer-to-peer network environment.

FIG. 1 illustrates one embodiment of a peer-to-peer network environment (100) that is layered on top of a standard network 40, such as a Wide-Area Network (WAN) or a Local-Area Network (LAN). Each device node connected to the network 40 may be logically coupled through the network 40 to any of the other nodes on the network 40 to form the peer-to-peer network environment 100. Each node may correspond to one or more physical devices. As illustrated, the peer-to-peer network environment 100 includes device 5, device 10, device 15, device 20, device 25, device 30 and device 35. Each device is at least capable of performing peer-to-peer communications with the other devices functioning as peers in the network environment 100. Peer-to-peer communications includes the sharing of computer resources and services by direct exchange between peer devices (or indirectly though an intermediate peer device). These resources and services may include the exchange of information, processing cycles, cache storage and disk storage for files among other examples, although all of the resources and services are not required to be present on each peer device. Therefore, each device 5, 10, 15, 20, 25, 30 and 35 in the network 100 may initiate a peer-to-peer communications session in the network environment 100.

Each device also has the capability of identifying devices it would like to communicate or initiate a relationship with, to discover devices entering and leaving the network environment 100 (discovery process) and to determine what communications protocol is being used in the network environment 100. For example, communication between peer devices may be via a wire and/or wireless protocol, such as TCP/IP, Bluetooth, 802.11x protocols commonly referred to as WiFi (Wireless Fidelity) and WAP (Wireless Application Protocol), which are used to exchange data across mobile telephone networks, among other communication protocols well known in the art.

The devices 5, 10, 15, 20, 25, 30 and 35 may include mobile devices such as a personal digital assistance (PDA), a mobile phone, a portable computer, a pager and a portable music player (e.g., MP3 player), among other devices. Alternatively, the devices 5, 10, 15, 20, 25, 30 and 35 may include typical non-mobile devices, such as a desktop computer, a home entertainment system, a set-top box and a gaming system, among other examples. An exemplary embodiment of a suitable device is described below in conjunction with FIG. 5.

It will be appreciated that the peer-to-peer network environment 100 illustrated in FIG. 1 does not limit the configuration of networks in which the embodiments of the invention may operate. For example, one of skill will readily appreciate that a server may be coupled to the peer-to-peer network to provide centralized services to the peer devices. Furthermore, one of skill in the art will immediately understand that more than one peer-to-peer network environment may be layered on the same underlying network structure and that each peer device may participate in multiple peer-to-peer network environments simultaneously.

Each device 5, 10, 15, 20, 25, 30 and 35 also includes relationship initiation software 50 that facilitates the creation, sharing, modifying and deletion of persona information, as will be described. Persona information may reflect the personality, behaviors, habits and personal interests of a user of each device. For example, the persona information for a user of a device may include a set of attributes such as an artist list, a song list, a favorite song list, a favorite artist list, rating of users, comments on songs, an interest list (e.g., vegetarian, chess player, etc.), among other attributes that relate to the user. Those of ordinary skill in the art will recognize that numerous attributes may be used and the invention is not limited to only those described herein.

In one embodiment, persona information associated with a user of a device is automatically collected. For example, a list of interests of a user of the device 5 may be automatically generated by recording the web sites, the user visits, the music the user listens to, the films the user watches, etc. The persona information may be stored as public and private persona information relating to the user of the device.

The relationship initiation software 50 on each device 5, 10, 15, 20, 25, 30 and 35 also allows the user of each device to initiate a relationship and store persona information from one or more of the other users of the devices on the network, as will be described. For example, a user may seek to initiate a relationship with another user by initiating a conversation (e.g., querying others for a restaurant recommendation, initiating an instant messaging session, etc.), to share digital content of common interest (e.g., music, poetry, literature, films, pictures, etc.), etc. Furthermore, depending on the type of relationship that is generated between the users, a level of trust may be built and visually displayed, as will be described.

It should also be understood that a relationship might be initiated by a user (e.g., a user determines whether to initiate an instant messaging session with another user on another device) or automatically by a device (e.g., a device automatically determines a musical piece to play based on a favorite list of another user having a common interest in music).

Figure 2:
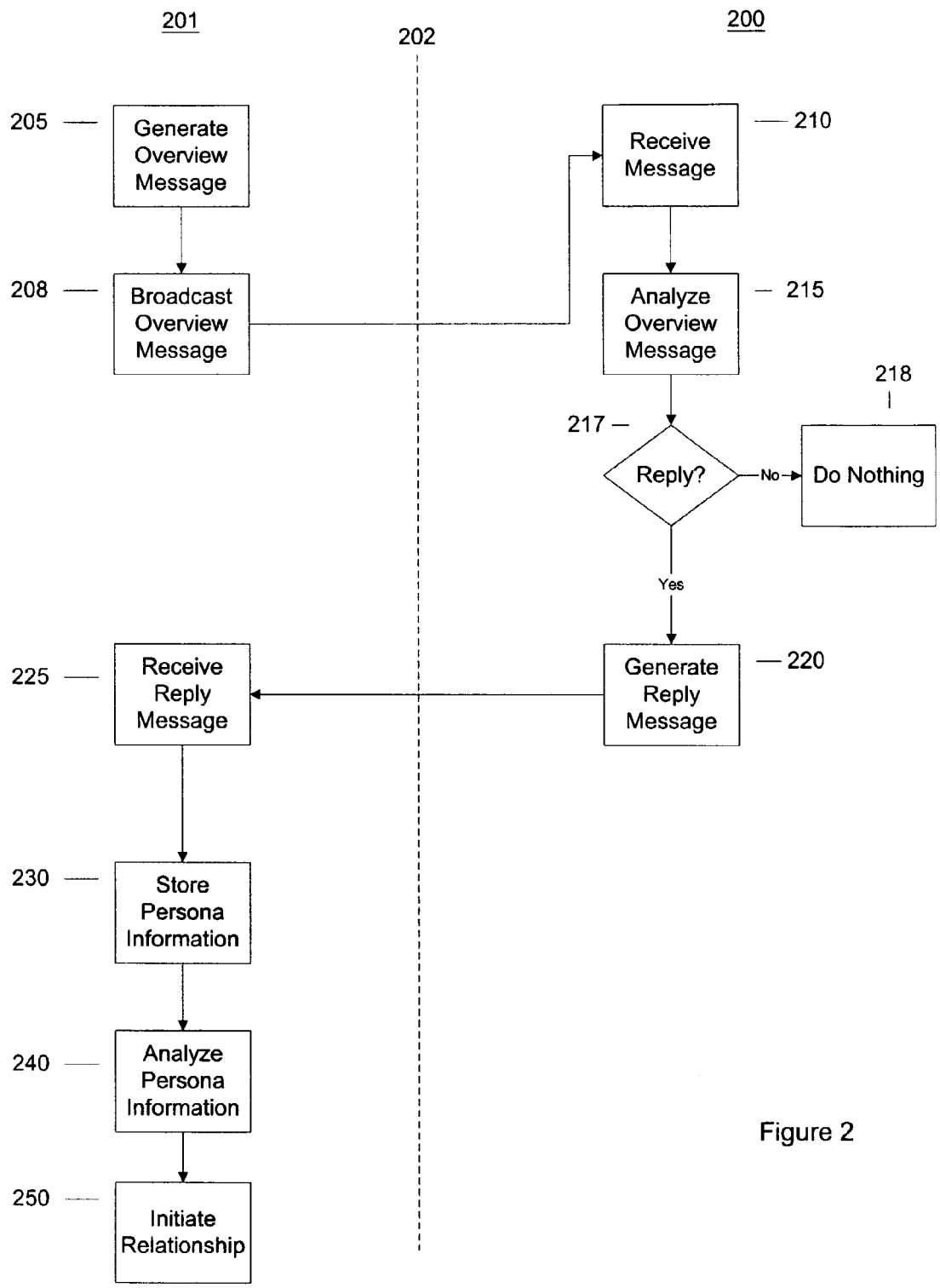
FIG. 2 illustrates one embodiment of a method for initiating a relationship between devices on the network.

FIG. 2 illustrates one embodiment of a method (200 and 201) executed by device 5 on the network 100 to initiate a relationship. In this embodiment, each device on the network 100 may broadcast an overview message to initiate a relationship between the devices, as will be described. In an alternative embodiment, the device may broadcast a query message onto the network 100 to each device. The query message may include a question, such as, "Does anyone recommend any nice vegetarian restaurants in San Francisco?" Upon receiving a reply, the originating device may weigh the reply, as will be described.

Although the description describes embodiments of the invention that use messages to communicate between the devices, it should be understood that messages as described herein may include numerous message configurations based on the communication protocol being used. Furthermore, those of ordinary skill in the art will recognize that other mechanisms may be used to initiate relationships that do not include messages and are not described herein as to not obscure the description.

A dotted line 202 in FIG. 2 separates the processing of device 5 and device 10. The method 201 illustrated for device 5 will transmit the initial overview message and the method 200 illustrated for device 10 shows an example of a process flow to receive the overview message. However, it should be understood that any of the devices might send the initial overview message or receive an overview message from another device.

At block 205, the device 5 generates an overview message. The overview message may include a subset or all of the persona information associated with the user of device 5. For example, the overview message may include personal interests of the user of device 5, such as being a chess player. The overview message may also include a query to the other users on the network. For example, the overview message may ask the other users on the network "Does anyone know of any nice vegetarian restaurants in San Francisco?"

At block 208, the device 5 broadcasts the overview message to the other devices on the network.

At block 210, the device 10 on the network 100 receives the overview message. Alternatively, it is understood that the overview message may be received by any one of the devices on the network 100. At block 215, the device 10 also analyzes the overview message. For example, the device 10 may analyze the overview message to determine areas of common interest with the user of device 5. The device 10 may also analyze the message to determine whether to answer the query. Based on the information included in the message the user of device 10 may decide to reply.

At block 217, the device 10 determines whether to reply to the overview message. If the device 10 determines not to reply to the overview message, control passes to block 218. If the device 10 determines to reply to the overview message, control passes to block 220.

At block 218, the device 10 does nothing in response to receiving the overview message and/or query. The device may automatically determine not to reply to the overview message based on the persona information received in the overview message. Alternatively, the user of the device 10 may not have an answer for the query.

At block 220, the device 10 generates a reply message and automatically replies directly to the device 5. The device 10 may reply directly with the device 5 based on an identifier included in the overview message received from the device 5. For example, the identifier may be an IP address associated with the device 5 that identifies the device 5 on the network 100. The reply message may include the subset or entire persona information of the user of device 10. For example, the reply message may include the personal interest of the user of device 10.

The device 10 may also decide to store in the reply message, a suggestion of another interest it assumes the user of device 5 might consider interesting based on the persona information received from device 5. For example, device 10 may assume that device 5 might enjoy a game of Checkers based on device 5's interest in the game of Chess, and include this suggestion in the reply message to device 5.

The reply message may also include an answer to the query. For example, the user of device 10 may suggest a vegetarian restaurant, or the device 10 may include in the reply message a copy of a favorite vegetarian restaurant list of the user of device 10.

In one embodiment, the device 10 may initiate a relationship directly with device 5 upon analyzing the overview message at block 215. For example, the user of device 10 may include in the reply message an indication to initiate a relationship to play a game of Chess.

At block 225, the device 5 receives the reply message from the device 10.

At block 230, the device 5 stores the persona information of device 10 into a data store (e.g., a database). The data store may be on device 5 or on another remote device. In this way, the device 5 may contain the persona information from one or more devices on the network. If the persona information is stored on another remote device, the user of device 5 may link to the data on the other device.

At block 240, the device 5 analyzes the persona information of device 10. For example, device 5 may automatically determine a shared interest of the user of device 5 and device 10. Device 5 may present automatically the shared interest to the user via a user interface on the device 5.

In one embodiment, the device 5 generates a visualization of one or more of the devices on the network that share a common interest with the device 5. That is, the device 5 may generate a visualization of a sub community of the entire network of devices at variable resolutions and time dynamics. The user interface may show network relationships among the various devices.

Figure 3:
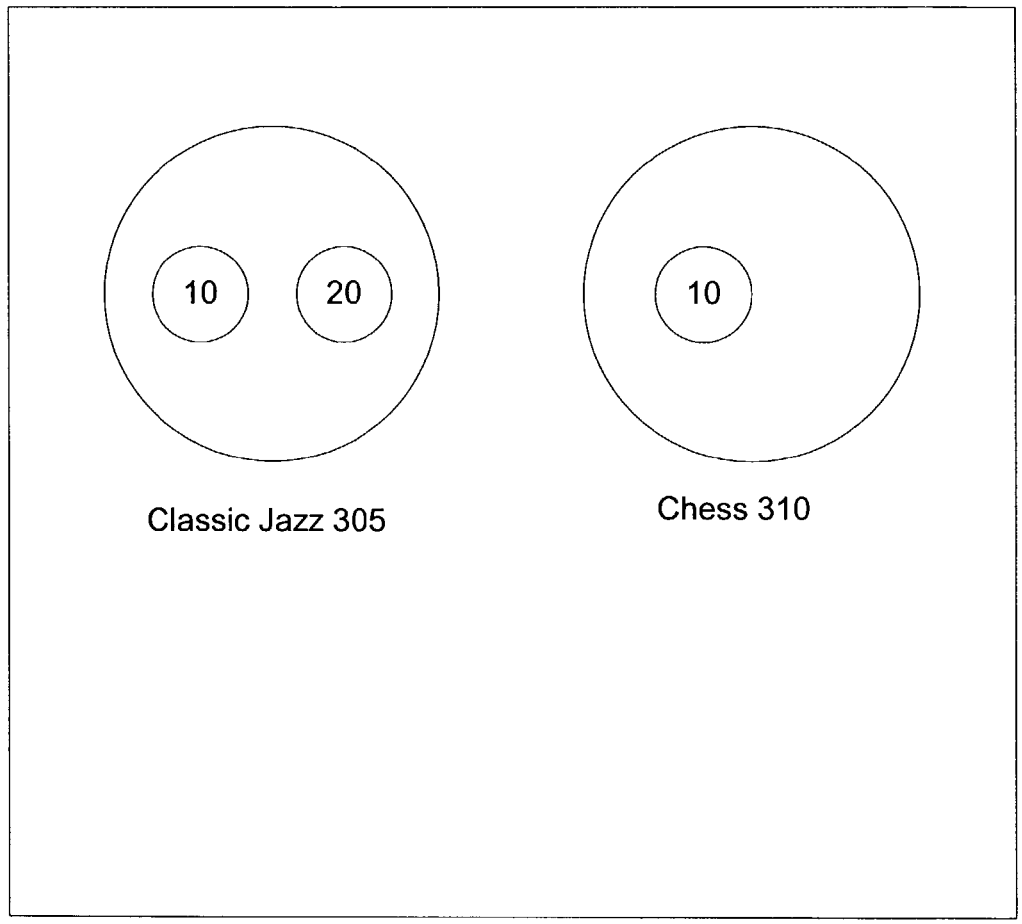
FIG. 3 illustrates one embodiment of a user interface.

FIG. 3 illustrates one embodiment of a user interface 300 to display the state and activities of devices on the network 100. User interface 300 includes a classic jazz indicia 305 and a Chess indicia 310. The classic jazz indicia 305 includes a representation of the device 10 and device 20 that share the same interest of classic jazz with the user of device 5. The Chess indicia 310 includes a representation of the device 10 that shares the same interest of Chess with the user of device 5. The representations may be displayed with various color codes to indicate expertise or level of trust. For example, the user interface 300 may illustrate device 10 having the color red, in the classic jazz indicia 305, which may indicate the user of the associated device 10 is an ardent listener of classic jazz. The user interface 300 may illustrate device 10 having the color green in the Chess indicia 310 to indicate a novice Chess player. Also, various visual color and patterns may be used to indicate a level of trust between the users of the devices. For example, the user interface 300 may illustrate the device 10 in the classic jazz indicia 305 with vertical parallel lines to indicate a high level of trust when exchanging music files. This trust level may be used to give more weight to a user's answers to questions, to determine when to initiate a relationship, or when to reply to an overview message.

It should be understood that the user interface 300 might include any number of possible visualizations based on the attributes of the persona information to represent similar relationships between users of devices on the network. A few examples are content or network maps, an animated grid of pixels that change color and blink rates depending on content type and activity, and status displays that show the users, exchange volume and appropriateness of content accessible from the peer devices on the network 100, among other examples.

The visualization may be interactive, allowing the individual to drill down on areas of interest to learn more and possibly initiate new relationships. Application software on each device may also include transactional tools that enable the sharing, playing and purchasing of network content.

At block 250, the device 5 initiates a relationship with one or more devices on the network. For example, the user may initiate a file swapping protocol to share music, literature, poetry, a film, etc. In another example, the user may initiate a conversation session with the one or more devices of the network via email, instant messaging, a chat room, etc. The user may also initiate a gaming session to, for example, play a game of Chess with a user having the same skill level on the network 100.

It should be understood that each device on the network 100 may post their persona information for other devices on the network to analyze and possibly initiate a relationship based on the persona information, as described in one embodiment above. The device 10 may also automatically include in the reply message a description of the current activity on the device 10. For example, the device 10 may indicate the user of device 10 is currently listening to classic jazz or playing a game of Chess against the device 10. Again, upon receiving the reply message, the user of device 10 may determine to initiate a relationship based on the current activity of a device on the network.

Figure 4:
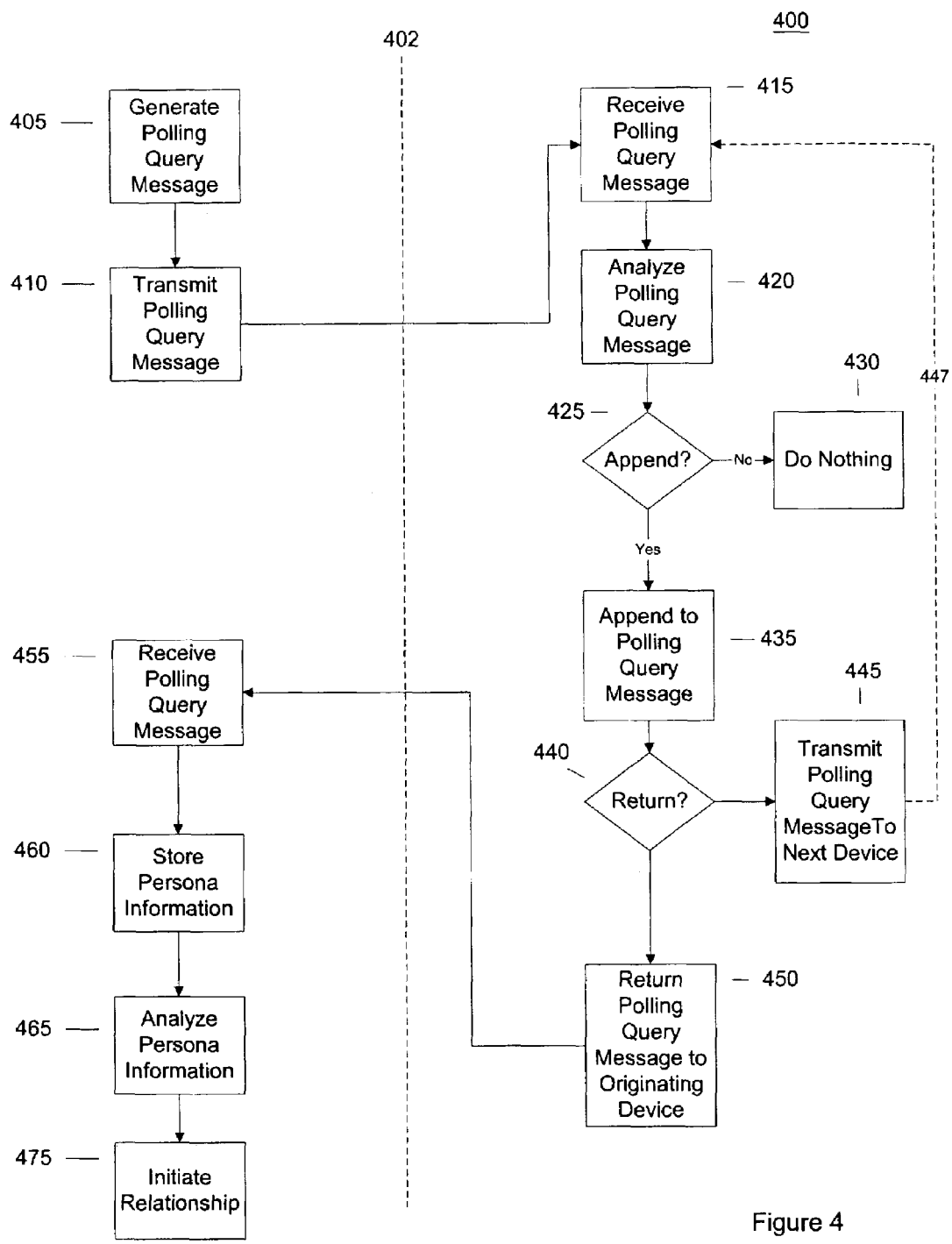
FIG. 4 illustrates another embodiment of a method for initiating relationships between devices on the network.

FIG. 4 illustrates another embodiment of a process flow (400) for initiating relationships between devices on the network 100. In this embodiment, an originating device generates a polling query message to be passed to each device on the network 100 to initiate a relationship between one or more devices, as will be described. The process flow 400 is divided by a dotted line 402 to show the separation of the processing of device 5 and device 10 on the network 100.

At block 405, the device 5 generates a polling query message to be shared with each device on the network 100. The polling query message may include a subset or the entire persona information of the device 5, such as being a Chess player.

At block 410, the device 5 transmits the polling query message to device 10 on the network 100.

At block 415, the device 10 receives the polling query message.

At block 420, the device 10 analyzes the polling query message. For example, the device 10 may analyze the polling query message to determine areas of common interest with the user of device 5.

At block 425, the device 10 determines whether to indicate a willingness to initiate a relationship with the device 5. If, at block 425, the device 10 chooses not to indicate a willingness to initiate a relationship with device 5, control passes to block 430. If, at block 425, the device 10 chooses to indicate a willingness to initiate a relationship with device 5, control passes to block 435.

At block 430, the device 10 does nothing in response to receiving the polling query message from the other devices. That is, the device 10 ignores the polling query message and forwards the message to the next device on the network.

At block 435, the device 10 stores a subset or all of the persona information for the user of the device 10 into the polling query message.

At block 440, the device 10 determines which device is next to receive the polling query message from device 10. If there is another device on the network 100 to receive the polling query message from the device 10, control is passed to block 445. If there is not another device on the network 100 to receive the polling query message, control passes to block 450.

At block 445, the device 10 determines whether to transmit the polling query message to a device that has not received the polling query message from device 5. It should be understood that, in one embodiment, when the next device (e.g., device 15) receives the polling query message it would follow a similar process flow as started at block 415, as illustrated by dotted line 447. In this way, each device may store persona information into the polling query message.

At block 450, the device 10 transmits the polling query message to the originating device 5.

At block 455, the device 5 receives the polling query message.

At block 460, the device 5 stores the persona information from the one or more devices into a data store (e.g., database). That data store may be on device 5 or on another remote device. In this way, the device 5 may contain the persona information from one or more devices on the network 100.

At block 465, the device 5 analyzes the returned polling query message. For example, the device 5 may build a model of the current community activity and areas of shared interest, as described above.

At block 475, the device 5 initiates and sends a negotiation query message to one or more devices that indicate a willingness to initiate a relationship. The relationship may be based on shared interest between the users of the devices. For example, the user of device 5 may chose to initiate a relationship with device 10 to play a Chess game using application software on each device.

It should be appreciated that the process flow 400 may be able to communicate with devices a further distance than which may be achieved via the broadcast process flow 200. Because a message is passed to each device, one device may be able to pass the message outside the local area network of the originating device. For example, an intermediate device in the path may be a gateway type device that connects two local area networks.

Figure 6:
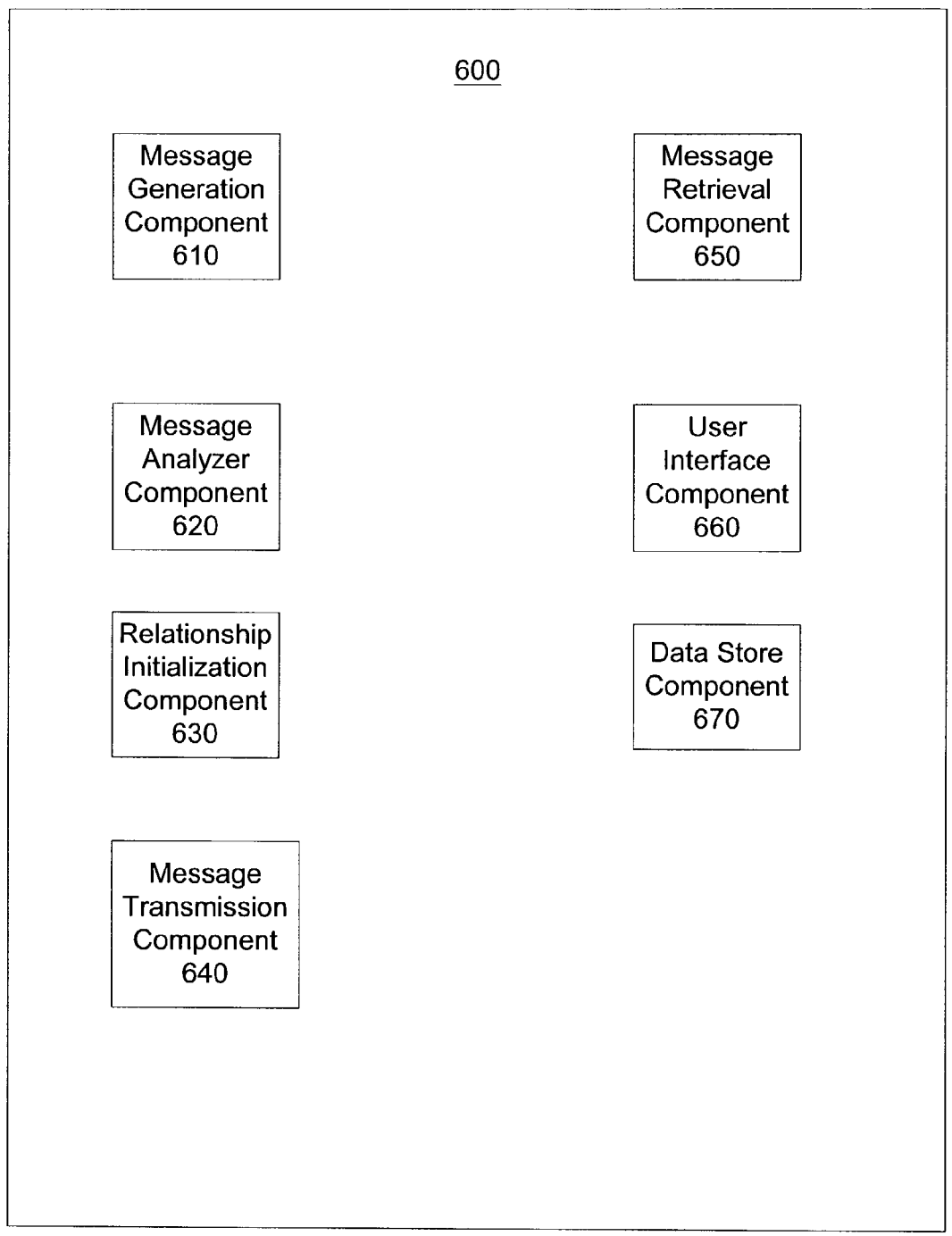
FIG. 6 illustrates a relationship initialization software component.

FIG. 6 illustrates components of the relationship initiation software 50 to be performed by a processor. The relationship initiation software 50 includes a message generation component 610, a message analyzer component 620, a relationship initialization component 630, a message transmission component 640, a message retrieval component 650, a user interface component 660 and a data store component 670.

The message generation component 610 includes software instructions to generate messages (e.g., an overview message, a reply message, a polling query message, a negotiation message, etc.), as described above for FIGS. 2 and 4. The message analyzer component 620 includes software instructions to analyze the messages (e.g., an overview message, a reply message, a polling query message, a negotiation message, etc.) exchanged between the devices on the network 100, as described above for FIGS. 2 and 4. The relationship initialization component 630 includes software instructions to initiate a relationship between devices on the network 100, as described above in FIGS. 2 and 4. The message transmission component 640 includes software instructions to transmit a message from a device on the network 100, as described for FIG. 5. The message retrieval component 650 includes software instructions to receive a message from a device on the network 100, as described for FIG. 5. The user interface component 660 includes software instructions to generate a visualization of the network 100, as described for FIG. 3. A data store component 670 includes software instructions to store and retrieve persona information from a data store, as described for FIGS. 2, 4 and 5.

Figure 5:
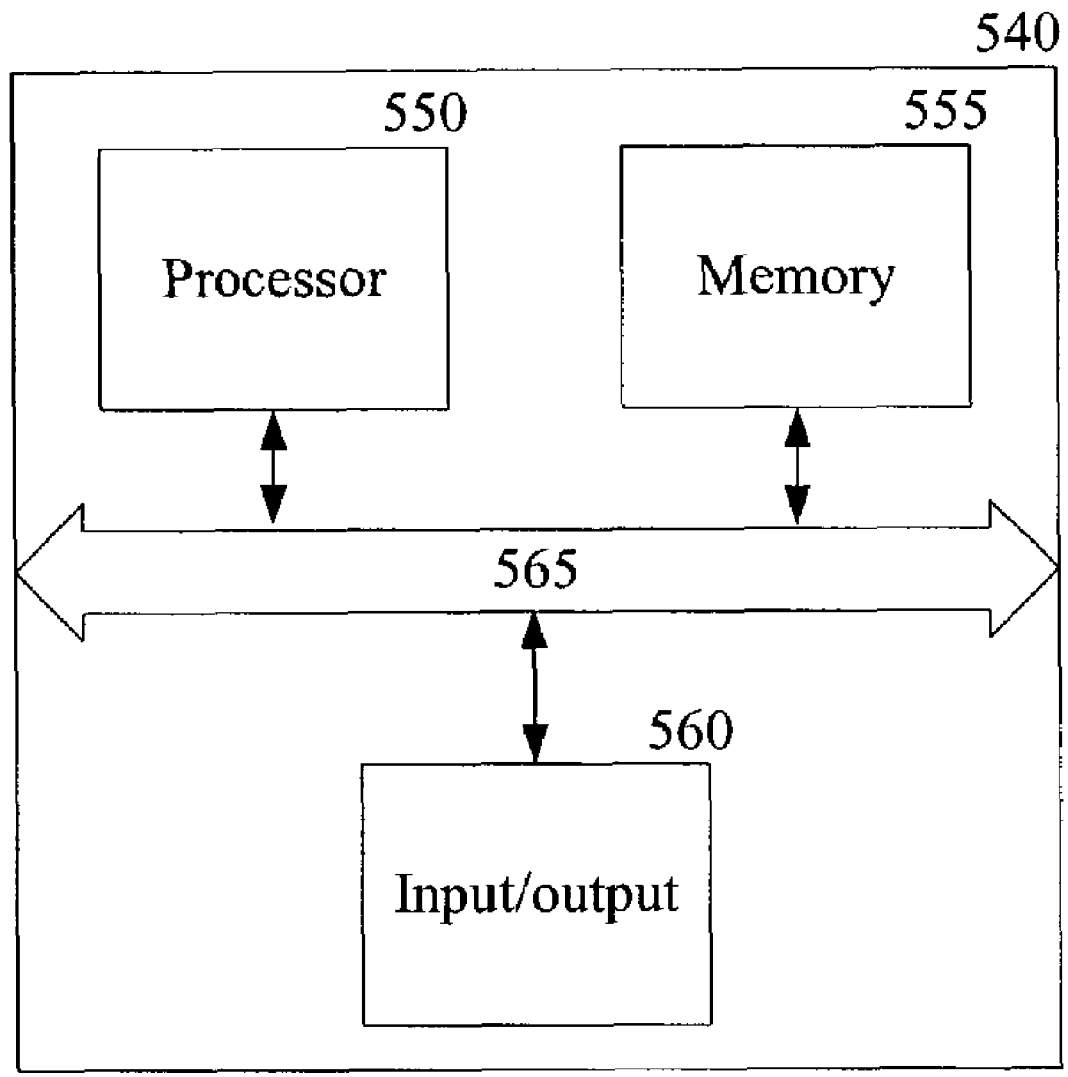
FIG. 5 illustrates a computer system according to one embodiment of the invention.

One embodiment of a system suitable for use in the environments of FIG. 1 is illustrated in FIG. 5. The system 540 includes a processor 550, a memory 555 and input/output capability 560 coupled to a system bus 565. The memory 555 is configured to store instructions which, when executed by the processor 550, perform the methods described herein. The memory 555 may also store data for performing the method (s) described in FIGS. 2 and 4. Input/output 560 provides for the delivery and display of the data for performing the methods(s) described in FIGS. 2 and 4 or portions or representations thereof. Input/output 560 also encompasses various types of machine or computer-readable media, including any type of storage device that is accessible by the processor 550. One of skill in the art will immediately recognize that the term "computer-readable medium/media" or "machine-readable medium/media" further encompasses a carrier wave that encodes a data signal. It will also be appreciated that the computer is controlled by operating system software executing in memory 555. Input/output and related media 560 stores the machine/computer-executable instructions for the operating system and methods of the present invention, as well as the data for performing the methods described in FIGS. 2 and 4. Input/output 560 may also include components to transmit and receive a message to/from one or more devices on the network 100 (e.g., via a network card, a modem and a fax card, among other examples).

The description of FIG. 5 is intended to provide an overview of computer hardware and various operating environments suitable for implementing the invention, but is not intended to limit the applicable environments. It will be appreciated that the system 540 is one example of many possible devices that have different architectures. A typical device will usually include at least a processor, a memory and a bus coupling the memory to the processor. Such a configuration encompasses personal computer systems, network computers, television-based systems, such as Web TVs or set-top boxes, handheld devices, such as cell phones and personal digital assistants, and similar devices. One of skill in the art will immediately appreciate that the invention can be practiced with other system configurations, including multiprocessor systems, minicomputers, mainframe computers and the like. The invention can also be practiced in distributed computing environments where tasks are performed by remote processing devices that are linked through a communications network.

It will be appreciated that more or fewer processes may be incorporated into the methods illustrated in FIGS. 2 and 4 without departing from the scope of the invention and that no particular order is implied by the arrangement of blocks shown and described herein. Describing the methods by reference to a flow diagram enables one of ordinary skill in the art to develop such programs including such instructions to carry out the methods on suitably configured computers (the processor of the computer executing the instructions from computer-readable media, including memory). The computer-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic, etc.), as taking an action or causing a result. Such expressions are merely a shorthand way of saying that execution of the software by a computer causes the processor of the computer to perform an action or produce a result.

In addition to the typical software subsystems of a peer-to-peer device, to perform device discovery, identification and communications protocol, as described above, each device on the network 100 may include relationship initialization software components.

A relationship initiation between devices in a network environment has been described. It should be understood that each device on the network 100 might share persona information. In this way, each device may also generate a visualization of the community with a user interface or analyze the network to determine whether to initiate a relationship with other devices having similar discovered interests. Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the present invention.

While the invention is not limited to any particular implementation, for the sake of clarity a simplified method and system for initiating relationships between devices has been described. For example, those of ordinary skill within the art will appreciate that a device may include multiple users. Each user of a single device has the capability to store individual persona information, which may be used to initiate a relationship with users of other devices on the network. Furthermore, the terminology used in this application with respect to "message" is meant to include any protocol to communicate between devices. Therefore, it is manifestly intended that this invention be limited only by the following claims and equivalents thereof.

What is claimed is:

1. A computerized method comprising:
   communicating persona information associated with a first user from a first peer device to a first set of one or more peer devices on a peer-to-peer network, wherein the peer network comprises the first peer device and the first set of one or more peer-to-peer devices;
   receiving persona information associated with a first set of one or more users corresponding to the first set of peer devices;
   communicating persona information associated with a second user from a second peer device to a second set of one or more peer devices on the peer-to-peer network, wherein the peer-to-peer network further includes the second peer device and the second set of one or more peer devices;
   receiving persona information associated with a second set of one or more users corresponding to the second set of peer devices;
   generating a first visualization map of the first peer device and the first set of one or more peer devices relative to a common interest identified in the persona information of the first user and the first set of one or more users, the first visualization map displaying the first peer device and the first set of one or more peer devices as a sub-community of the peer-to-peer network;
   generating a second visualization map of the second peer device and the second set of one or more peer devices relative to a common interest identified in the persona information of the second user and the second set of one or more users, the second visualization map displaying the second peer device and the second set of one or more peer devices as a sub-community of the peer network; and
   initiating a relationship between the first peer device and each of the peer devices in the first set of one or more peer devices that satisfy the common interest identified in the persona information of the first user and the first set of one or more users.

2. The method of claim 1, wherein communicating persona information includes broadcasting the persona information associated with the first user to a plurality of peer devices in the peer-to-peer network.

3. The method of claim 1, wherein communicating persona information includes transmitting a first message from the first peer device to one of the first set of one or more peer devices for forwarding to a third peer device.

4. The method of claim 3, further comprising:
   receiving the first message from the third peer device, the first message including persona information associated with a third user associated with the third peer device.

5. The method of claim 1, further comprising analyzing the persona information of the first user and the first set of one or more users for a common interest.

6. The method of claim 1, wherein initiating a relationship includes swapping an electronic file with one of the first set of one or more devices.

7. The method of claim 1, wherein initiating a relationship includes initializing an instant messaging session with one of the first set of one or more users.

8. The method of claim 1, wherein the initiating a relationship includes initializing a gaming session with one of the first set of one or more users.

9. The computerized method of claim 1, wherein the first set of one or more peer devices and the second set of one or peer devices include peer devices common to each set of one or more peer devices.

10. The computerized method of claim 1, wherein the first set of one or more peer devices includes the second peer device.

11. The computerized method of claim 1, wherein the second set of one or more peer devices includes the first peer device.

12. A machine-readable storage medium having embodied thereon executable instructions to cause a device to perform a method comprising:
    communicating persona information associated with a first user from a first peer device to a first set of one or more peer devices on a peer-to-peer network, wherein the peer network comprises the first peer device and the first set of one or more peer-to-peer devices;
    receiving persona information associated with a first set of one or more users corresponding to the first set of peer devices,
    communicating persona information associated with a second user from a second peer device to a second set of one or more peer devices on the peer-to-peer network, wherein the peer-to-peer network further includes the second peer device and the second set of one or more peer devices;
    receiving persona information associated with a second set of one or more users corresponding to the second set of peer devices;
    generating a first visualization map of the first peer device and the first set of one or more peer devices relative to a common interest identified in the persona information for the first user and the first set of one or more users, the first visualization map displaying the first peer device and the first set of one or more peer devices as a sub-community of the peer-to-peer network;
    generating a second visualization map of the second peer device and the second set of one or more peer devices relative to a common interest identified in the persona information of the second user and the second set of one or more users, the second visualization map displaying the second peer device and the second set of one or more peer devices as a sub-community of the peer network; and
    initiating a relationship between the first peer device and each of the peer devices in the first set of one or more peer devices that satisfy the common interest identified in the persona information of the first user and the first set of one or more users.

13. The machine-readable storage medium of claim 12, wherein communicating persona information includes broadcasting the persona information associated with the first user to a plurality of peer devices in the peer-to-peer network.

14. The machine-readable storage medium of claim 12, wherein communicating persona information includes transmitting a first message from the first peer device to one of the set of one or more peer devices for forwarding to a third peer device.

15. The machine-readable storage medium of claim 14, further comprising:
receiving the first message from the third peer device, the first message including persona information associated with a third user associated with the third peer device.

16. The machine-readable storage medium of claim 12, further comprising:
analyzing the persona information of the first user and first set of one or more users for a common interest.

17. The machine-readable storage medium of claim 12, wherein initiating a relationship includes swapping an electronic file with the one of the set of one or more devices.

18. The machine-readable storage medium of claim 12, wherein initiating a relationship includes initializing an instant messaging session with one of the set of one or more users.

19. The machine-readable storage medium of claim 12, wherein the initiating a relationship includes initializing a gaming session with one of the set of one or more users.

20. A system comprising:
a first peer device to exchange persona information with a first set of one or more devices in a peer-to-peer network, the first peer device comprising,
a first processor coupled to a first memory through a first bus, the first memory storing persona information associated with a first user, and
a first relationship initiation process to visually identify a user on a network that shares a common interest with the first user, the relationship initiation process executed by the first processor from the first memory to cause the first processor to communicate the persona information associated with the first user to a first set of one or more peer devices on the peer-to-peer network, the first device being one of a plurality of peer devices on the network, to receive persona information associated with a first set of one or more users corresponding to a first set of one or more devices, to generate a first visualization map of the devices relative to a common interest identified in the persona information of the first user and the first set of one or more users, the first visualization map displaying the first peer device and the first set of one or more peer devices as a sub-community of the peer-to-peer network, and to initiate a relationship with the first device based on the common interest; and
a second peer device to exchange persona information with a second set of one or more devices in a peer-to-peer network, the second peer device comprising,
a second processor coupled to a second memory through a second bus, the second memory storing persona information associated with a second user, and
a second relationship initiation process to visually identify a user on a network that shares a common interest with the second user, the relationship initiation process executed by the second processor from the second memory to cause the second processor to communicate the persona information associated with the second user to a second set of one or more peer devices on the peer-to-peer network, the second device being one of a plurality of peer devices on the network, to receive persona information associated with a second set of one or more users corresponding to a second set of one or more devices, to generate a second visualization map of the devices relative to a common interest identified in the persona information of the second user and the second set of one or more users, the second visualization map displaying the second peer device and the second set of one or more peer devices as a sub-community of the peer-to-peer network.

21. The system of claim 20, wherein the first relationship initiation process further causes the first processor to broadcast the persona information associated with the first user to the plurality of peer devices.

22. The system of claim 20, wherein the first relationship initiation process further causes the first processor to transmit a first message to one of the first set of one or more devices, wherein the one of the first set of one or more devices is to forward the first message to a third device, the third device being one of the plurality of peer devices on the network.

23. The system of claim 22, the first relationship initiation process further causes the first processor to receive the first message from the one of the first set of one or more devices, the first message including persona information associated with a third user associated with a third peer device.

24. The system of claim 20, the first relationship initiation process further causes the first processor to analyze the persona information of the first user and the first set of one or more users for a common interest.

25. The system of claim 20, wherein the first relationship initiation process further causes the first processor, when initiating a relationship, to swap an electronic file with the first set of one or more peer devices.

26. The system of claim 20, wherein the first relationship initiation process further causes the first processor, when initiating a relationship, to initiate an instant messaging session with one of the first set of one or more users.

27. The system of claim 20, wherein the first relationship initiation process further causes the first processor, when initiating a relationship, to initiate a gaming session with one of the first set of one or more users.

28. An apparatus comprising:
means for exchanging persona information with a first set of one or more peer devices in a peer-to-peer network, wherein each of the exchanged persona information corresponds to one of a first user associated with the apparatus and one of a first set of one or more users corresponding to the first set of one or more peer devices and said means for exchanging includes means for transmitting persona information of the first user to each of the first set of one or more peer devices and each of the first set of one or more peer devices generates a visualization map specific to that peer device based on the transmitted persona information of the apparatus and the stored persona information of that peer device;
means for generating a visualization map specific to the apparatus relative to a common interest identified in the persona information for the first user and first set of one or more users, the visualization map displaying the first peer device and the first set of one or more peer devices as a sub-community of the peer-to-peer network; and
means for initializing a relationship with the device based on the common interest, the means for exchanging coupled with the means for initializing.

29. The apparatus of claim 28, wherein the means for exchanging further includes:
a means for receiving a reply message from that one of the first set of one or more peer devices, the reply message to include the persona information of the user of the peer device.

30. The apparatus of claim 28, further comprising:

a means for analyzing the persona information received in the reply message.

31. The apparatus of claim 30, further comprising a means for generating a user interface to display the visualization.

32. The apparatus of claim 28, wherein the means for initializing a relationship includes a means for performing a conversation over the network between one of the first set of one or more peer devices and the apparatus.

33. The apparatus of claim 28, wherein the means for initializing a relationship includes a means for swapping a content file over the network between the first set of one or more peer devices and the apparatus.

34. The apparatus of claim 28, wherein the means for initializing a relationship includes a means for performing a gaming session over the network between one of the first set of one or more peer device and the apparatus.

* * * * *